(12) United States Patent
Burns, III et al.

(10) Patent No.: US 7,587,416 B2
(45) Date of Patent: Sep. 8, 2009

(54) ADVANCED DESKTOP REPORTING

(75) Inventors: Charles H. Burns, III, Redmond, WA (US); Alexander A. Sourov, Seattle, WA (US); Keshav M. Puttaswamy, Redmond, WA (US); Marcel P. F. Parent, Hamilton (CA)

(73) Assignee: Microsoft Corporation, Redmond, WA (US)

( * ) Notice: Subject to any disclaimer, the term of this patent is extended or adjusted under 35 U.S.C. 154(b) by 319 days.

(21) Appl. No.: 11/303,204

(22) Filed: Dec. 15, 2005

(65) Prior Publication Data

US 2007/0143350 A1 Jun. 21, 2007

(51) Int. Cl.
*G06F 17/30* (2006.01)
(52) U.S. Cl. ............................. 707/103 R; 707/2; 707/3
(58) Field of Classification Search ...................... 707/2, 707/3
See application file for complete search history.

(56) References Cited

U.S. PATENT DOCUMENTS

| | | | | |
|---|---|---|---|---|
| 5,918,232 | A * | 6/1999 | Pouschine et al. ....... | 707/103 R |
| 6,405,208 | B1 * | 6/2002 | Raghavan et al. ............ | 707/102 |
| 6,609,123 | B1 * | 8/2003 | Cazemier et al. ................ | 707/4 |
| 6,768,986 | B2 * | 7/2004 | Cras et al. ........................ | 707/2 |
| 7,284,011 | B1 * | 10/2007 | Narayanaswamy et al. . | 707/102 |
| 2002/0091707 | A1 * | 7/2002 | Keller ...................... | 707/104.1 |
| 2003/0120593 | A1 * | 6/2003 | Bansal et al. .................. | 705/39 |
| 2003/0225769 | A1 * | 12/2003 | Chkodrov et al. ........... | 707/100 |
| 2004/0122844 | A1 * | 6/2004 | Malloy et al. ................ | 707/102 |
| 2005/0076036 | A1 * | 4/2005 | Le ............................. | 707/100 |
| 2005/0246357 | A1 * | 11/2005 | Geary et al. ................. | 707/100 |

* cited by examiner

*Primary Examiner*—Hosain T Alam
*Assistant Examiner*—Syling Yen
(74) *Attorney, Agent, or Firm*—Merchant & Gould; Ryan T. Grace

(57) ABSTRACT

A multidimensional database report is automatically generated from data provided by an application without the need to access a server or server application. A client-side process takes the data from a desktop or client-side application and generates cube files that are stored locally with respect to the desktop application. A cube-consuming application retrieves the multidimensional data from the cube files and constructs a client-side generated report. The report is generated in real-time and respects the settings for the data used in the desktop application. The data in the generated cube files stays connected with the desktop application, so that when data is updated in the application, the data in the cube is also updated.

12 Claims, 4 Drawing Sheets

ADVANCED DESKTOP REPORTING

BACKGROUND

Online analytical processing (OLAP) is an integral part of most data warehouse and business analysis systems. OLAP services provide for fast analysis of multidimensional information. For this purpose, OLAP services provide for multidimensional access and navigation of the data in an intuitive and natural way, providing a global view of data that can be "drilled down" into particular data of interest. Speed and response time are important attributes of OLAP services that allow users to browse and analyze data online in an efficient manner. Further, OLAP services typically provide analytical tools to rank, aggregate, and calculate lead and lag indicators for the data under analysis.

In OLAP, information is viewed conceptually as cubes, consisting of dimensions, levels, and measures. In this context, a dimension is a structural attribute of a cube that is a list of members of a similar type in the user's perception of the data. Typically, hierarchy levels are associated with each dimension. For example, a time dimension may have hierarchical levels consisting of days, weeks, months, and years, while a geography dimension may have levels of cities, states/provinces, and countries. Dimension members act as indices for identifying a particular cell or range of cells within a multidimensional array. Each cell contains a value, also referred to as a measure, or measurement.

The fact that OLAP refers to "online" as a portion of its definition means that OLAP reporting is typically done at the server level. Data for populating the OLAP cube is pulled from a SQL database and put into cubes via a server that manages multidimensional cubes of data for analysis. While, data in the SQL database is populated as it comes in, usually the cube creation is done as a batch job, either overnight or during another low processing period. Accordingly, the data generation and cube generation processes are unconnected processes that occur separately. One example of such a server is MICROSOFT SQL SERVER Analysis Services, which is a middle-tier server for OLAP cube processing and data mining. The functionality included in these types of servers organizes data from a data warehouse into cubes with pre-calculated aggregation data. Functionality is also provided to generate data mining models from both multidimensional and relational data sources. The server is able to be accessed by reports, such as a PIVOTTABLE report included in the MICROSOFT EXCEL spreadsheet software. These structured reports retrieve data from the server and present it to the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the subject matter disclosed herein are related to generating a multidimensional database report automatically from data provided by an application, without the need to access a server or server application. In one aspect, a report is generated without transmitting the data over a network. A client-side process takes the data from a desktop or client-side application and forwards it to a client-side repository that stores the data in format consumable by a locally-stored cube generation application. The cube generation application takes the data from the client-side repository along with structure data for constructing the cube, and generates OLAP cube files that are stored locally with respect to the desktop application. A cube-consuming application retrieves the multidimensional data from the cube files and constructs a client-side generated report. The report is generated in real-time and respects the settings for the data used in the desktop application. Also, the data in the generated OLAP cube stays connected with the desktop application, so that when data is updated in the application, the data in the cube is also updated.

These and other features and advantages, which characterize the various aspects of the disclosed subject matter, will be apparent from a reading of the following detailed description and a review of the associated drawings. It is to be understood that both the foregoing general description and the following detailed description are exemplary and explanatory only and are not restrictive of the invention as claimed.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
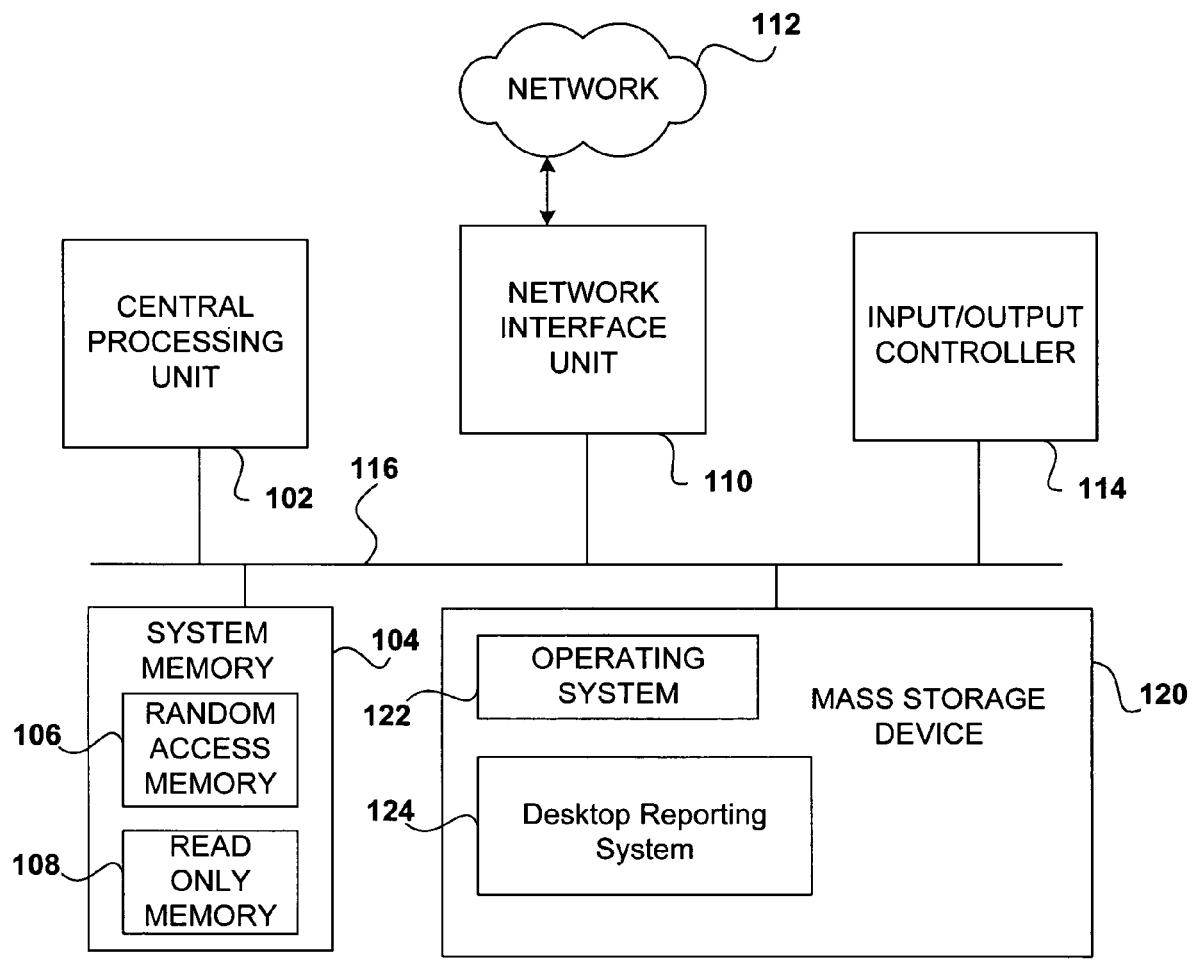
FIG. 1 illustrates an exemplary computing architecture for a computer.

Embodiments are herein described more fully below with reference to the accompanying drawings, which form a part hereof, and which show specific examples for practicing the embodiments. However, embodiments may be implemented in many different forms and should not be construed as limited to the embodiments set forth herein; rather, these embodiments are provided so that this disclosure will be thorough and complete, and will fully convey the scope of the subject matter to those skilled in the art. Embodiments disclosed may be practiced as methods, systems or devices. Accordingly, embodiments disclosed may take the form of an entirely hardware implementation, an entirely software implementation or an implementation combining software and hardware aspects. The following detailed description is, therefore, not to be taken in a limiting sense.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments of the described herein are referred to variously as operations, structural devices, acts or modules. These operations, structural devices, acts and modules may be implemented in software, in firmware, in special purpose digital logic, and any combination thereof.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an exemplary computer architecture for a computing device 100 utilized in various embodiments will be described. The computer architecture shown in FIG. 1 may be configured in many different ways. For example, the computer may be configured as a personal computer, a mobile computer and the like. As shown, computing device 100 includes a central processing unit 102 ("CPU"), a system memory 104, including a random access memory 106 ("RAM") and a read-only memory ("ROM") 108, and a system bus 116 that couples the memory to the CPU 102. A basic input/output system containing the basic routines that help to transfer information between elements within the computer, such as during startup, is stored in the ROM 108. The computing device 100 further includes a mass storage device 120 for storing an operating system 122, application programs, and other program modules, which will be described in greater detail below.

The mass storage device 120 is connected to the CPU 102 through a mass storage controller (not shown) connected to the bus 116. The mass storage device 120 and its associated computer-readable media provide non-volatile storage for the computing device 100. Although the description of computer-readable media contained herein refers to a mass storage device, such as a hard disk or CD-ROM drive, the computer-readable media can be any available media that can be accessed by the computing device 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computing device 100.

Although not used in embodiments described herein, the computing device 100 operates in a networked environment using logical connections to remote computers through a network 112, such as the Internet. The computing device 100 may connect to the network 112 through a network interface unit 110 connected to the bus 116. The network interface unit 110 may also be utilized to connect to other types of networks and remote computer systems.

The computing device 100 may also include an input/output controller 114 for receiving and processing input from a number of devices, such as: a keyboard, mouse, electronic stylus and the like. Similarly, the input/output controller 114 may provide output to a display screen, a printer, or some other type of device (not shown).

As mentioned briefly above, a number of program modules and data files may be stored in the mass storage device 120 and RAM 106 of the computing device 100, including an operating system 122 suitable for controlling the operation of a networked computer, such as: the WINDOWS XP® operating system from MICROSOFT® CORPORATION; UNIX®; LINUX® and the like. The mass storage device 120 and RAM 106 may also store one or more program modules. In particular, the mass storage device 120 and the RAM 106 may store a desktop reporting system 124.

As described herein, desktop reporting system 124 includes functionality for generating multidimensional reports real-time without the need for a reporting server. The process for generating the multidimensional report (see FIG. 3) takes place client-side without server communication. A multidimensional report generated as described herein is seamless in its presentation in comparison to server generated reports, but does not have the associated downtime resulting from batch processing. The multidimensional report provides the data from the cube as a rich, analytical format (see FIG. 4).

Throughout the specification and claims, the following terms take the meanings explicitly associated herein, unless the context clearly dictates otherwise.

"Client-side" or "desktop" denotes processes and applications that are stored and run on a computing device without accessing a server over a network.

"Cube", "OLAP cube", or "multidimensional database" generally refers to a multidimensional structure for storing and accessing data that is constructed of dimensions or members and values. The structure may be thought of as dimensional extensions to the two dimensional array of a spreadsheet.

"Document" is generally defined as any page, sheet, form, or other construction of an application that comprises text, graphical objects, tables, data cells, or other types of data representations. Examples of documents include word processor documents, spreadsheets, charts, slides, web pages, worksheets, notes, e-mail messages, instant messages, drawings, schematics, images, and other arrangements of text and/or graphical objects.

"Multidimensional database report", "multidimensional report", or "report" refers to a presentation of multidimensional data in a rich, analytical format. The report usually coincides with data that has been stored in a cube, and provides a presentation of that data.

Figure 2:
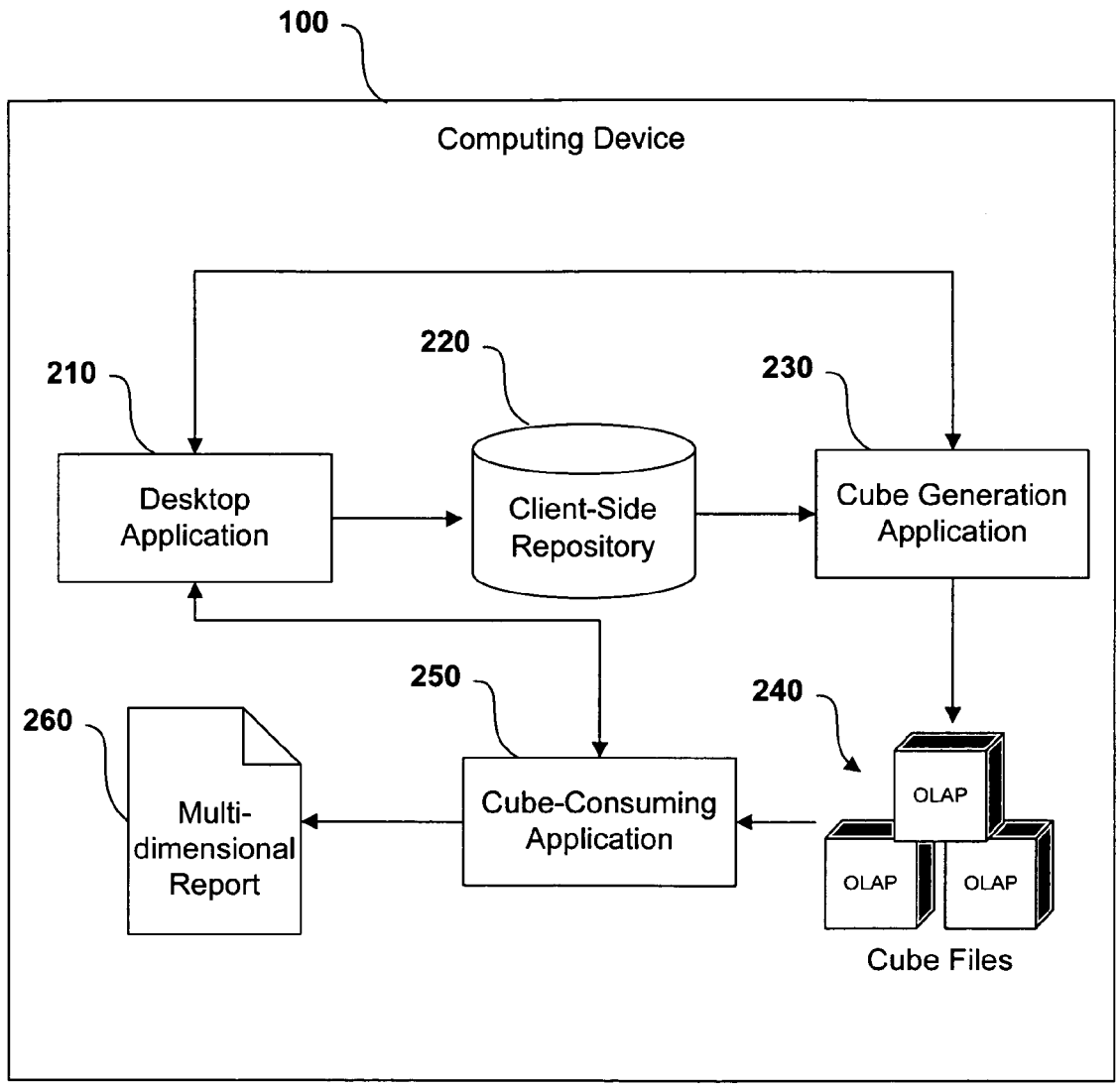
FIG. 2 illustrates a functional block diagram of an exemplary system for generating a multidimensional report.

FIG. 2 illustrates a functional block diagram of an exemplary system 200 for generating a multidimensional report, in accordance with the present disclosure. In this embodiment, system 200 operates within computing device 100 and includes desktop application 210, client-side repository 220, cube generation application 230, cube files 240, cube-consuming application 250, and multi-dimensional report 260.

Desktop application 210 may include any type of application, from spreadsheet applications, to word processing applications, to proprietary applications. With the variety of desktop applications that may be used, the data may also be in a variety of formats.

In one embodiment, generation of cube files 240 requires that the data for the cube files be stored in an analytical database. Client-side repository 220 is provided as an analytical database to place the data in a format that may be used to generate the cube files 240. In one example, the MICROSOFT ACCESS® application is used to provide the analytical database structure in a desktop environment.

Communication between desktop application 210 and client-side repository 220 may be accomplished through a variety of formats. In one embodiment, communication is provided using ODBC and its database APIs. ODBC refers to the Open DataBase Connectivity access method which allows access to any data from any application, regardless of which database management system (DBMS) is handling the data. ODBC manages this by inserting a middle layer, called a database driver (not shown), between the desktop application 220 and the client-side repository 220. The purpose of this layer is to translate the application's data into commands that client-side repository 220 understands.

Cube generation application 230 corresponds to an application that allows creation of OLAP cube files (e.g., cube files 240). In one embodiment, the MICROSOFT® Analysis Services application includes a desktop component called "PIVOTTABLE® Services" which is stored locally and allows users to create OLAP cube files.

Again, communication between client-side repository 220 and cube generation application 230 may be accomplished through a variety of formats. In another embodiment, the communication is provided according to OLEDB. OLEDB is a COM-based data access object which provides access to all types of data, including access to disconnected data stores. OLEDB sits between an ODBC layer and the cube generation application 230. Calls are first sent to OLEDB, which are then sent to the ODBC layer. Data sent to cube generation application 230 includes the location of client-side repository 220 as well as the structure and layout for the cubes. In one embodiment, the structure and layout for the cubes is derived from the structure and layout of the data in desktop application 210. This structure and layout information may be obtained from either client-side repository 220 or from desktop application 210 directly. The structure and layout information may include information such as what data comes first (e.g., sales in California before sales in Washington), the units of the data (e.g., per pound, per crate, per thousand dollars, etc.), as well as any conditional formatting of the data (e.g., negative numbers are in red).

Cube files 240 are stored locally on the user's computing device. Cube files 240 may correspond to multiple OLAP cubes of data or a single OLAP cube that corresponds to the data of desktop application 210. Other types of multidimensional structures may be used other than OLAP cubes without departing from the spirit or scope of the invention.

Cube-consuming application 250 may be any of a variety of applications that are capable of recognizing and processing data from a multidimensional database. In one embodiment, cube-consuming application 250 corresponds to either the MICROSOFT EXCEL® spreadsheet application or the MICROSOFT VISIO® drawing application for the report rendering. In one embodiment, desktop application 210 drives cube-consuming application 250 through the object model associated with cube-consuming application. Using the object model from cube-consuming application 250, the cube-consuming application is pointed to cube files 240 previously created. Driving cube-consuming application 250 with desktop application 210 automatically creates a pivot-chart type worksheet, and binds that pivot-chart worksheet to cube files 240. Without the desktop application driving cube-generation application 250, the end user would have to manually point the cube consuming application to the cube file, which breaks the seamless report creation experience. Multidimensional report 260 is generated by cube-consuming application 250. An exemplary multidimensional report is discussed in greater detail below in conjunction with FIG. 4.

Figure 3:
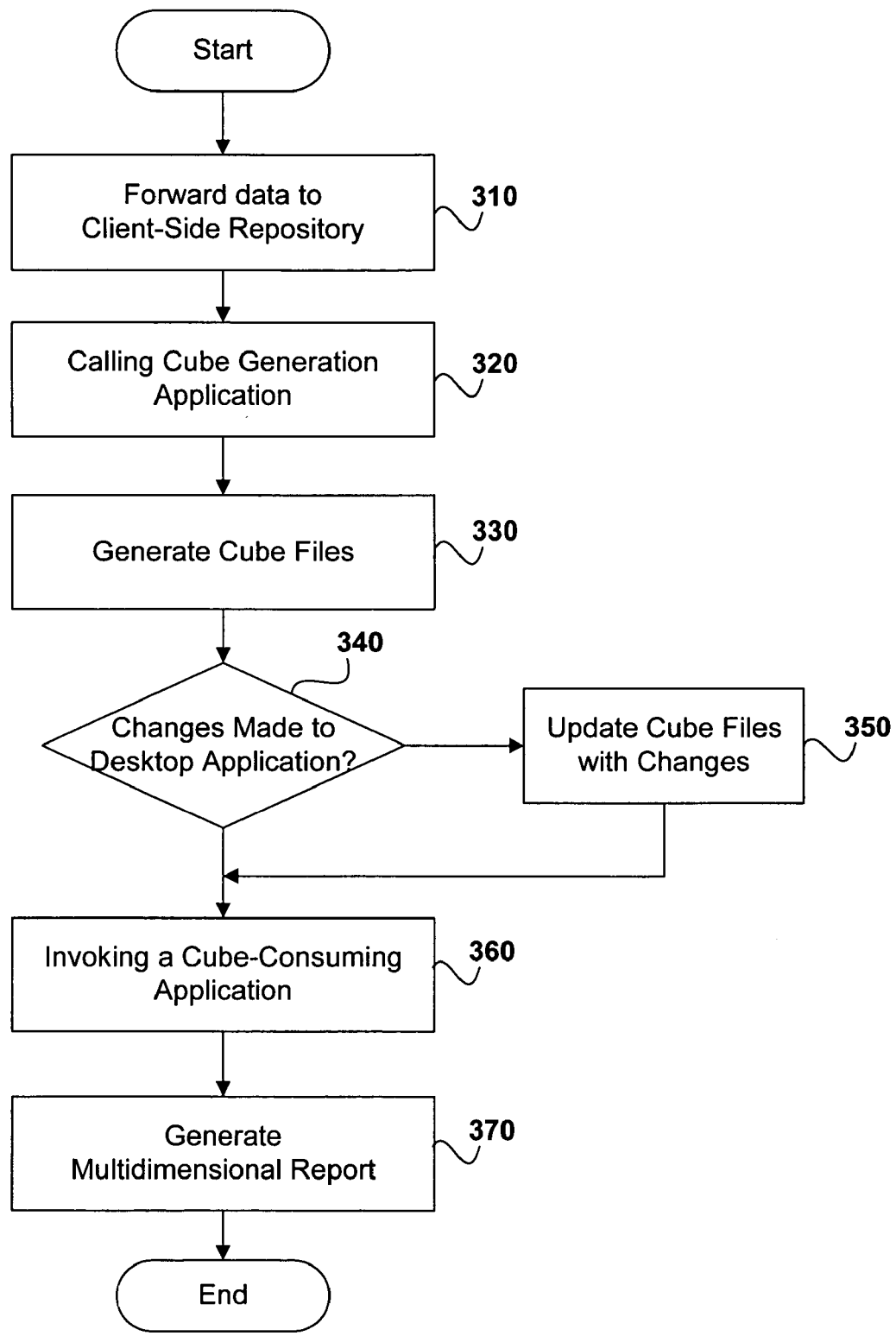
FIG. 3 is an operational flow diagram of an exemplary client-side process for generating a desktop version of a multidimensional database report.

FIG. 3 is an operational flow diagram of an exemplary client-side process for generating a desktop version of a multidimensional database report, in accordance with the present disclosure. Client-side process 300 may be performed in any suitable computing environment. For example, process 300 may be performed by a system such as system 200 (FIG. 2). Therefore, the description of process 300 may refer to at least one of the components of FIG. 2. However, any such reference to components of FIG. 2 is for descriptive purposes only, and it is to be understood that the implementation of FIG. 2 are non-limiting environments process 300. Client-side process 300 starts when a selection has been made in association with a desktop application (e.g., 210 of FIG. 2) to generate a multidimensional report from the data of the desktop application. Processing continues with operation 310.

At operation 310, the data of the desktop application is forwarded by the desktop application to a client-side repository. In one embodiment, the client-side repository corresponds to client-side repository 220 of FIG. 2. As previously stated, one embodiment uses ODBC for the communication of the data from the desktop application to the client-side repository. The client-side repository stores the data in a format that is consumable by a cube generation application. Once the data is stored in the client-side repository, processing continues with operation 320.

At operation 320, a cube generation application is called to generate cube files from the data included in the client-side repository. In one embodiment, the cube generation application corresponds to cube generation application 230 of FIG. 2. As previously stated, one embodiment uses OLEDB for the communication of the data from the desktop application to the client-side repository. The data received by cube generation application includes the desktop application data as well as structure and layout data for the cube files to be generated. In one embodiment, cube generation application 230 is a dynamic link library that is called for generation of the cube files. Once the cube generation application is called and linked with the data included in the client-side repository, processing continues to operation 330.

At operation 330, cube files are generated from the data included in the client-side repository. In one embodiment, the cube generation application creates the one or more cube files from the data included in the client-side repository. The structure and layout of the cube takes advantage of the structure and layout data that was provided to the cube generation application. In one embodiment, the cube files correspond to OLAP cube files or other multidimensional structures. Once the cube files are generated, processing moves to decision operation 340.

At decision operation 340, a determination is made whether during generation of the cube files, the original data included in the desktop application has changed. If the data of the desktop application has not changed, processing advances to operation 360. However, if the data of the desktop application has changed, processing moves to operation 350.

At operation 350, the cube files are updated with the changes of the desktop application data. By updating the files, client-side process 300 ensures that the report being generated reflects the latest data provided in the desktop application. In one embodiment, the changes are passed through the client-side repository and the cube generation application to update the cube files. In an alternative embodiment, operations 350 and 360 are not part of client-side process 300, but are part of a separate parallel process. The parallel process periodically checks the desktop application for changes and provides a list of the changes directly to an application (e.g., cube generation application 230 of FIG. 2) that manages the state of the cube files. The application takes the list of changes and updates the cube files. Once the cube files are generated and populated with the latest data, processing continues at operation 360.

At operation 360, a cube-consuming application is invoked to convert the data included in the cube files into the multidimensional report. In one embodiment, the cube-consuming application corresponds to cube-consuming application 250 of FIG. 2. After the cube-consuming application receives or is pointed to the data of the cube files, processing continues at operation 370.

At operation 370, a multidimensional report is generated by the cube-consuming application from the data included in the cube files. The multidimensional report may correspond to a variety of presentations of the data that are selectable by a user. The data include in the multidimensional report reflects the latest update of the data that was present just before the report was generated. Also, because the report bases its structure and layout from the structure and layout of the cube files, the report also reflects the structure and layout of the desktop application. Additionally, the multidimensional report is generated in real-time in response to a selection by a user to generate the report. Once the user selects to generate the report, the remainder of the process is hands-off for the user and does not require further user intervention. Generation of the report does not require waiting on or communication with a separate server process. Also, the multidimensional report does not differ substantially in appearance from traditional reports generated by server processes. An example of a multidimensional report generated according to client-side process 300 is provided in FIG. 4. Once the multidimensional report is generated, process 300 ends and processing with relation to the desktop application moves on to other tasks.

One aspect of process 300 is that it takes place without "continuing" user intervention. Continuing user intervention refers to requiring the user to provide inputs during the operations of the process. Instead, a user simply selects to have the report generated and enters input at that time and the process then automatically generates the report. The user is not required to enter additional instructions to store the data in the client-side repository, to generate the cube files, to invoke the cube-consuming application, or to generate the multidimensional report.

Although client-side process 300 is illustrated and described sequentially in a particular order, in other embodiments, the operations described may be performed in different orders, multiple times, and/or in parallel. Further, in some embodiments, one or more operations may be omitted, or parsed with some sub-operations being performed as part of another operation, omitted or combined.

Figure 4:
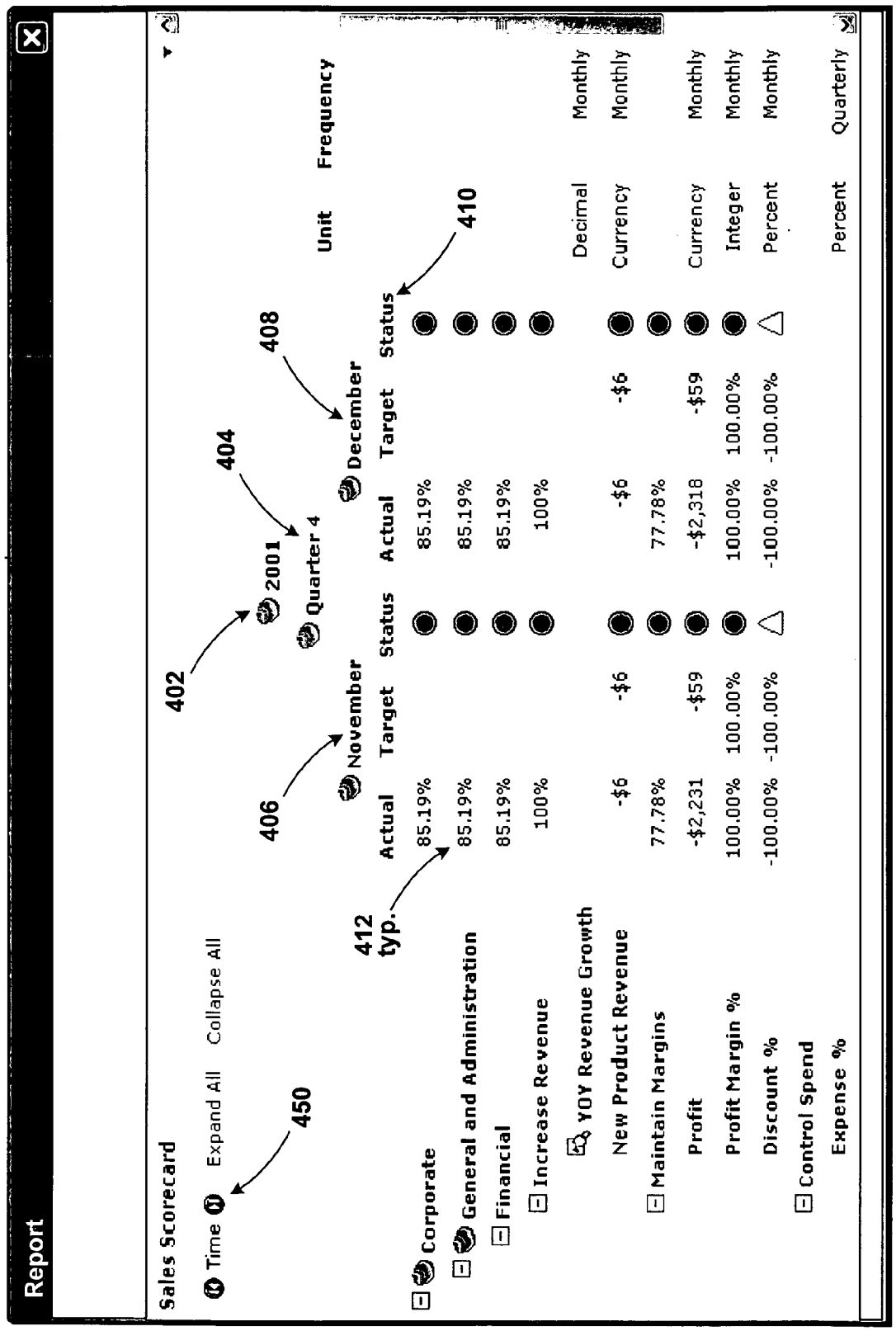
FIG. 4 illustrates an exemplary multidimensional report generated from a client-side desktop reporting process, in accordance with aspects of the present invention.

FIG. 4 illustrates an exemplary multidimensional report generated from a client-side desktop reporting process, in accordance with the present disclosure. Exemplary multidimensional report 400 corresponds to a sales scorecard that includes sales data (e.g., 412) organized according to the time dimension and a result type dimension (e.g, 410). The time dimension is structured according to years (e.g., 402), quarters (e.g., 404), and months (e.g., 406, 408). In addition, the data is further organized according to a second dimension of data type 410 that classifies the data according to actual values, target values, and status. The data for the sales report was taken from an exemplary desktop application proprietary to a sales corporation. The desktop application included the sales data but had no means of providing the sales data in an analytical presentation. The desktop reporting system described herein is able to convert the data from the desktop application into a meaningful analytical report in real-time, with the structure and layout of the report reflecting the structure and layout of the desktop application. The report is generated without continuing user intervention during the generation process, and the report reflects the latest data included in the desktop application just before the report was generated.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for automatic client-side generation of a multidimensional report, wherein a network server is not accessed, the method comprising:

receiving a selection on a client-side application of a client-side computing device, wherein the selection is a selection to generate a multidimensional report for data of the client-side application;

upon receiving the selection, automatically forwarding the data to a client-side repository on the client-side computing device, wherein the client-side application communicates with the client-side repository through open database connectivity, wherein communication through open database connectivity includes inserting a database driver between the client-side application and the client-side repository to translate the data into commands configured for the client-side repository, wherein communication through open database connectivity includes inserting a database driver between the client-side application and the client-side repository to translate the data into commands configured for the client-side repository;

automatically storing the data in the client-side repository in association with a structure for generating a cube on the client-side computing device;

automatically calling a client-side cube generation application of the client-side computing device, wherein the data and the structure of the client-side repository are automatically linked to the client-side cube generation application, wherein the client-side cube generation application and the client-side repository communicate through a COM-based access object, wherein the COM-based access object is configured between an open database connectivity layer and the client-side cube generation application;

automatically generating, with the client-side cube generation application, a cube file in accordance to the linked data and the linked structure of the client-side repository;

after generating the cube file with the client-side cube generation application, automatically determining whether the cube file requires updating by accessing the client-side application;

when the client-side application indicates that the data has changed, automatically updating the cube file with the changed data, automatically invoking a client-side cube consuming application on the client-side computing device to convert the cube file into a multidimensional report, automatically generating, by the client-side cube consuming application the multidimensional report from the cube file; and when the client-side application does not indicate that the data has changed, automatically invoking the client-side cube consuming application to convert the cube file into a multidimensional report, and automatically generating, by the client-side cube consuming application the multidimensional report from the cube file.

2. The computer-implemented method of claim 1, wherein the client-side cube generation application is a dynamic link library.

3. The computer-implemented method of claim 1, wherein the multidimensional report is generated in real time and conforms to settings associated with the data in the client-side application.

4. The computer-implemented method of claim 1, wherein the cube is an online analytical processing cube.

5. The computer-implemented method of claim 1, wherein automatically storing the data in the client-side repository in association with a structure for generating a cube on the client-side computing device further includes automatically storing the data in the client-side repository in association with a layout for generating the cube on the client-side computing device.

6. A computer-readable storage medium having computer-executable instructions executed by a processor for automatic client-side generation of a multidimensional report, wherein a network server is not accessed, the instructions comprising:

receiving a selection on a client-side application of a client-side computing device, wherein the selection is a selection to generate a multidimensional report for data of the client-side application;

upon receiving the selection, automatically forwarding the data to a client-side repository on the client-side computing device, wherein the client-side application communicates with the client-side repository through open database connectivity, wherein communication through open database connectivity includes inserting a database driver between the client-side application and the client-side repository to translate the data into commands configured for the client-side repository;

automatically storing the data in the client-side repository in association with a structure for generating a cube on the client-side computing device;

automatically calling a client-side cube generation application of the client-side computing device, wherein the data and the structure of the client-side repository are automatically linked to the client-side cube generation application, wherein the client-side cube generation application and the client-side repository communicate through a COM-based access object, wherein the COM-based access object is configured between an open database connectivity layer and the client-side cube generation application;

automatically generating, with the client-side cube generation application, a cube file in accordance to the linked data and the linked structure of the client-side repository;

after generating the cube file with the client-side cube generation application, automatically determining whether the cube file requires updating by accessing the client-side application;

when the client-side application indicates that the data has changed, automatically updating the cube file with the changed data, automatically invoking a client-side cube consuming application on the client-side computing device to convert the cube file into a multidimensional report, automatically generating, by the client-side cube consuming application the multidimensional report from the cube file; and when the client-side application does not indicate that the data has changed, automatically invoking the client-side cube consuming application to convert the cube file into a multidimensional report, and automatically generating, by the client-side cube consuming application the multidimensional report from the cube file.

7. The computer-readable storage medium of claim 6, wherein the client-side cube generation application is a dynamic link library.

8. The computer-readable storage medium of claim 6, wherein the multidimensional report is generated in real time and conforms to settings associated with the data in the client-side application.

9. computer-readable storage medium of claim 6, wherein the cube is an online analytical processing cube.

10. The computer-readable storage medium of claim 6, wherein automatically storing the data in the client-side repository in association with a structure for generating a client-side cube further includes automatically storing the data in the client-side repository in association with a layout for generating the client-side cube.

11. A system for automatic client-side generation of a multidimensional report, wherein a network server is not accessed, the system comprising:

a processor; and a memory having computer-executable instructions stored thereon, wherein the computer-executable instructions are configured for:

receiving a selection on a client-side application of a client-side computing device, wherein the selection is a selection to generate a multidimensional report for data of the client-side application;

upon receiving the selection, automatically forwarding the data to a client-side repository on the client-side computing device, wherein the client-side application communicates with the client-side repository through open database connectivity, wherein communication through open database connectivity includes inserting a database driver between the client-side application and the client-side repository to translate the data into commands configured for the client-side repository;

automatically storing the data in the client-side repository in association with a structure for generating a cube on the client-side computing device;

automatically calling a client-side cube generation application of the client-side computing device, wherein the data and the structure of the client-side repository are automatically linked to the client-side cube generation application, wherein the client- side cube generation application and the client-side repository communicate through a COM-based access object, wherein the COM-based access object is configured between an open database connectivity layer and the client-side cube generation application;

automatically generating, with the client-side cube generation application, a cube file in accordance to the linked data and the linked structure of the client-side repository;

after generating the cube file with the client-side cube generation application, automatically determining whether the cube file requires updating by accessing the client-side application;

when the client-side application indicates that the data has changed, automatically updating the cube file with the changed data, automatically invoking a client-side cube consuming application on the client-side computing device to convert the cube file into a multidimensional report, automatically generating, by the client-side cube consuming application the multidimensional report from the cube file; and when the client-side application does not indicate that the data has changed, automatically invoking the client-side cube consuming application to convert the cube file into a multidimensional report, and automatically generating, by the client-side cube consuming application the multidimensional report from the cube file.

12. The system of claim 11, wherein automatically storing the data in the client-side repository in association with a structure for generating a cube on the client-side computing device further includes automatically storing the data in the client-side repository in association with a layout for generating the cube on the client-side computing device.

* * * * *